United States Patent [19]

Takeuchi

[11] 4,047,683

[45] Sept. 13, 1977

[54] PIPE HANGER

[75] Inventor: Kazuaki Takeuchi, Hita, Japan

[73] Assignee: Chuo Hatsujo Kogyo Co., Ltd., Hita, Japan

[21] Appl. No.: 679,291

[22] Filed: Apr. 22, 1976

[30] Foreign Application Priority Data

Sept. 30, 1975 Japan .................... 50-134617[U]

[51] Int. Cl.² .......................................... E21F 17/02
[52] U.S. Cl. ................................. 248/62; 248/74 B
[58] Field of Search ..................... 248/58, 60, 61, 62, 248/63, 64, 65, 73, 74 R, 74 A, 74 B, 74 PB, 231

[56] References Cited

U.S. PATENT DOCUMENTS

| 1,362,244 | 12/1920 | Farley | 248/62 |
| 1,476,093 | 12/1923 | McGinty | 248/61 |
| 1,642,131 | 9/1927 | Tomkinson | 248/62 |
| 2,303,108 | 11/1942 | Blackburn | 248/61 |
| 2,854,723 | 10/1958 | Clapper | 248/74 R |

FOREIGN PATENT DOCUMENTS

| 638,626 | 6/1950 | United Kingdom | 248/74 B |
| 597,259 | 1/1948 | United Kingdom | 248/74 B |

Primary Examiner—Robert A. Hafer
Attorney, Agent, or Firm—Frank J. Jordan

[57] ABSTRACT

A pipe hanger includes a pipe holder made from a strip of sheet material formed into a loop and a fitting element which is adapted to be suspended from a ceiling and to which the looped strip is secured. The looped strip has hooks adapted to fit into apertures in the fitting element to initially temporarily mount the looped strip on the mounting element, with complete securement being subsequently effected by fastening means.

7 Claims, 7 Drawing Figures

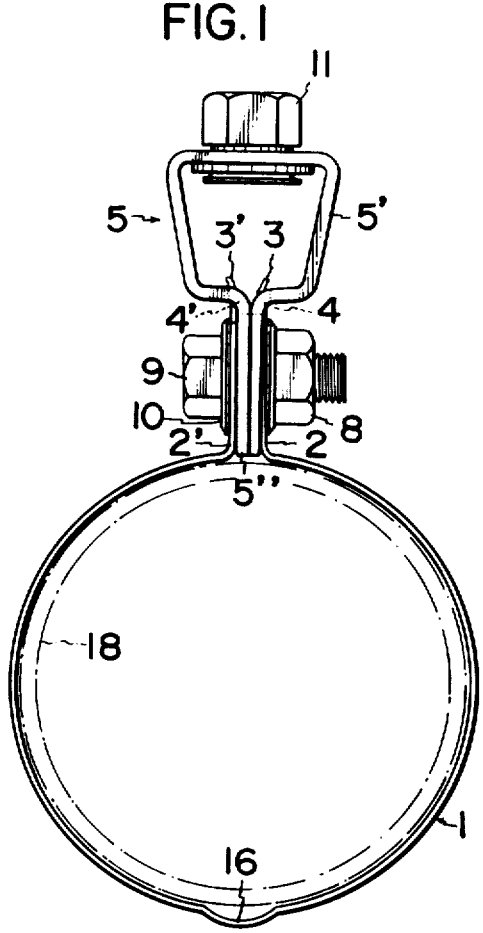
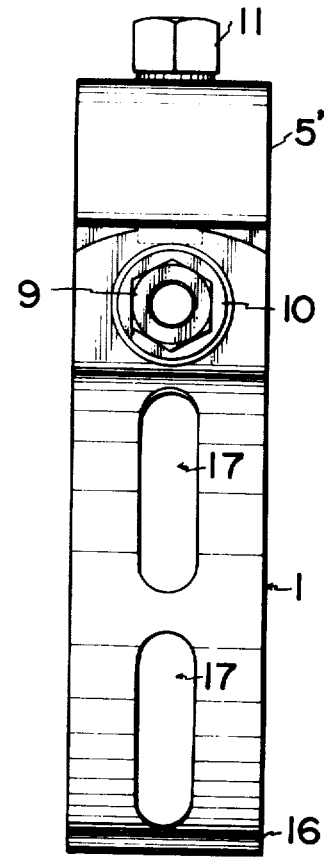
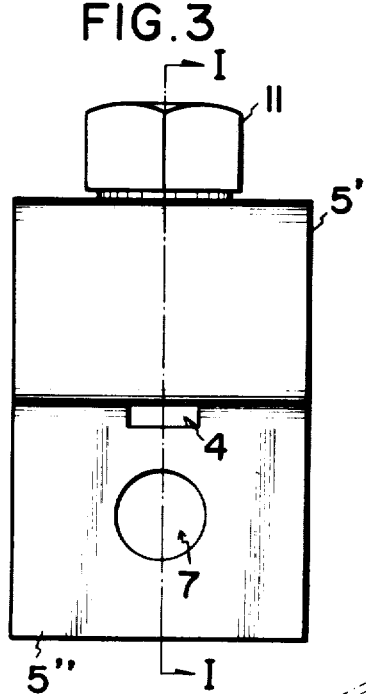
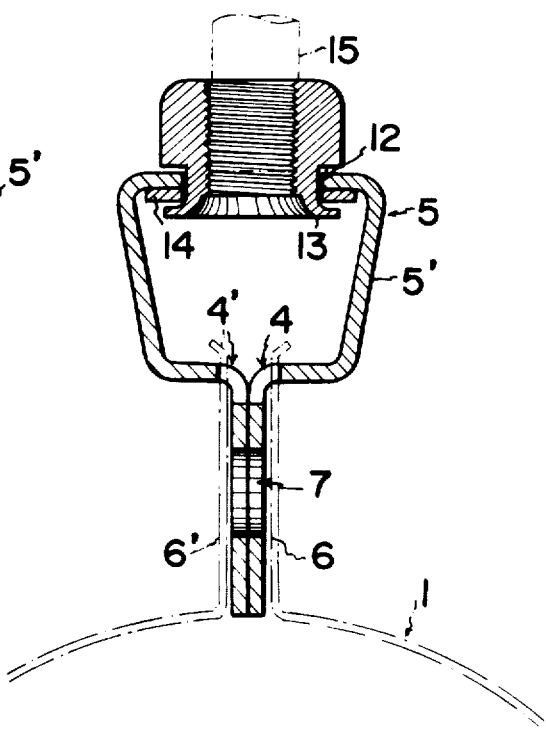

U.S. Patent Sept. 13, 1977 Sheet 2 of 2 4,047,683
FIG. 5
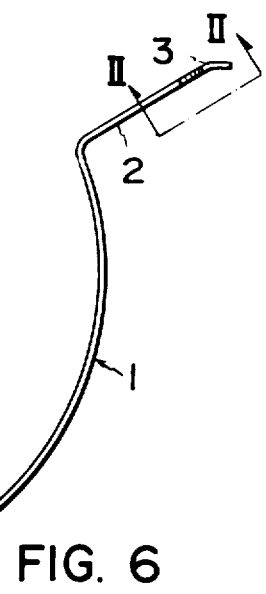
FIG. 6
FIG. 7
PRIOR ART
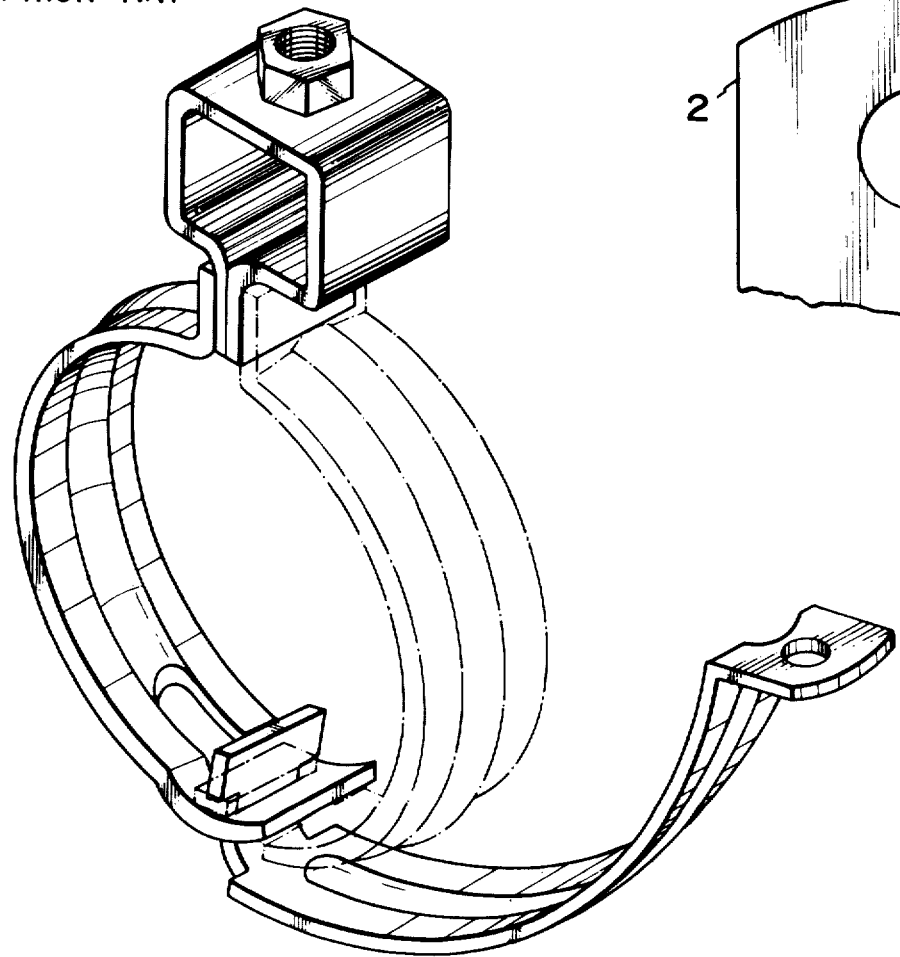

4,047,683

PIPE HANGER

BACKGROUND OF THE INVENTION

This invention relates to a pipe hanger which comprises a loop-shaped strip of sheet material for holding a pipe therein.

In a typical loop-type, conventional pipe hanger as shown in FIG. 7 for example, the main body of the pipe hanger is substantially comprised of two parts. In general, for holding or encircling a pipe, the pipe hanger must be expanded, and since it is structurally composed of material with little elasticity, it must be composed of two parts which must be connected to form a loop wherein each part has one end pivotally hinged to the corresponding end of the other part.

Furthermore, with the remarkable increase of skyscrapers or high-rise buildings in the past few decades, pipes of larger diameters must be employed in larger quantities which necessitates improvement of the pipe hangers in view of the weight and size of the pipes.

Conventional methods have attempted to meet the above requirements by increasing the thickness of the pipe hanger, which, in turn, gives rise to another problem, namely, that the total weight of the hanger is increased. Accordingly, the handling as well as the installation becomes extremely laborious and time-consuming.

In the present invention, since the strip of sheet metal is made of resilient material, it overcomes the necessity that the pipe hanger be made of two parts. After the strip of sheet metal encircles the pipe, the operation to fixedly secure the looped sheet to the suspending attachment is easily effected since the looped sheet is temporarily attached to the fitting prior to the final securing operation by means of the engagement of a hook portion with a fitting through an opening in the fitting. Overall weight and thickness can be substantially reduced since the material used may be made of stainless steel, which is superior to ordinary structural material in strength and highly durable even in the worst atmospheric conditions where dew and condensation occur.

It is an object of the present invention to provide a pipe hanger for holding pipes in which the pipe hanger is substantially made of a strip of sheet material which has resilient properties such that it is not necessary to be opened by means of a pivot joint.

It is another object of the present invention to provide a pipe hanger for holding pipes which is simply constructed and which need not be composed of multiple parts.

It is still another object of the present invention to provide a pipe hanger for holding pipes in which the thickness of the pipe hanger can be substantially decreased.

It is yet another object of the present invention to provide a pipe hanger for holding pipes in which the weight of the pipe hanger can be substantially reduced.

It is yet another object of the present invention to provide a pipe hanger for holding pipes in which the pipe hanger is of high durability.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A pipe hanger comprises a pipe holder made from a strip of sheet material formed into a loop, the strip having two end portions forming lugs extending generally radially relative to the loop. The lugs have terminating end sections forming hooks. A fitting means is provided from which the pipe holder is suspended, the fitting means having a mounting portion adapted to be rotatably secured to a ceiling and an inserting portion inserted into the space between the lugs. The fitting means has apertures in which the hooks are accommodated, the pipe holder being initially temporarily mounted on the fitting means by engagement of the hooks in the apertures. Fastening means are provided for securing the pipe holder to the fitting means, whereby the pipe holder is initially temporarily secured to the fitting means for engagement of the hooks in the apertures and subsequently completely secured by the fastening means.

BRIEF DESCRIPTION OF THE DRAWINGS

FIG. 1 is an end view of a pipe hanger according to one embodiment of the invention.

FIG. 2 is a side view of the pipe hanger shown in FIG. 1.

FIG. 3 is a side view of the suspending attachment.

FIG. 4 is a cross-sectional view taken along line I—I in FIG. 3.

FIG. 5 is an end view of the strip sheet material in an open position.

FIG. 6 is a partial view of FIG. 5 looking along line II—II in FIG. 5.

FIG. 7 is a perspective view of a prior art pipe hanger.

DETAILED DESCRIPTION OF THE PREFERRED EMBODIMENTS

This invention relates to a pipe hanger for suspending from the ceiling of a structure various kinds of pipes as may be used, for example for air conditioning systems, water, drains, and the like.

The construction of the pipe hanger of this invention is disclosed hereinafter in conjunction with the accompanying drawings.

In FIG. 1, numeral 1 indicates a loop-shaped strip of sheet material which is made of a resilient material such as stainless steel. Both ends of the loop 1 are bent outwardly to form vertical lug portions 2, 2'. The end of each lug portion is further bent outwardly to a predetermined amount to form hook portions 3 or 3' (see FIGS. 1 and 5) for temporarily securing the loop 1 to a fitting 5. The fitting 5 substantially comprises a mounting portion 5' and an inserting portion 5" which is made of abutting end portions and which is inserted into the space between vertical lug portions 2,2'. Numerals 4,4' indicate apertures formed in a portion of the fitting 5 where the mounting portion 5' and the inserting portion 5" meet. These apertures 4,4' are employed for receiving the hook portions 2,2' of the loop 1. Numerals 6,6' and 7 are aligned apertures formed in the vertical lug portions 2,2' and the inserting portion 5" of the fitting 5 respectively.

A fastening means which fixedly secures the loop to the fitting 5 comprises a nut 8, a bolt 9 and washers 10. Numeral 11 indicates a rotatable nut which forms a part of the fitting 5 and is rotatably mounted on the mounting portion 5'. The rotatable nut 11 has a cylindrical portion, a section of which has a reduced diameter. The fitting 5 is rotatably attached to the nut 11 in such a way that the aforementioned reduced diameter section of the nut 11 is rotatably disposed within an aperture 12 formed in the fitting 5. The lower portion of the nut forms a trumpet-shaped or flange portion 13 which is larger in diameter than the diameter of the aperture 12. A flat washer 14 is rotatably disposed between the upper portion of the mounting portion 5' and the lower flange portion 13. Numeral 15 indicates a holding bolt which is vertically suspended from the ceiling and which has a distal end thereof threaded into the nut 11.

With respect to the configuration of the loop 1, a lowermost portion 16 thereof may be protruded outwardly to a desired amount for decreasing the resiliency or elasticity of the loop 1 if required. Furthermore, elongated apertures 17 may be formed on both curved sides of the loop 1 for decreasing the total weight of the loop 1. Numeral 18 indicates a pipe to be supported by the pipe hanger.

The manner in which the pipe hanger is employed for supporting the pipe 18 is hereinafter disclosed in conjunction with the accompanying drawings.

The fitting 5 is first rotatably suspended from the ceiling in such a way that the threaded distal end of the holding bolt 15 which is suspended from the ceiling is threaded into the nut 11 of the fitting 5. The strip 1 is first arranged to encircle the pipe 18 for temporarily securing the pipe 18 to the fitting 5. This may be accomplished by opening the strip, for example, as shown in FIG. 5, placing it around the pipe, and then inserting the hook portions 3,3' into the apertures 4,4' respectively in the fitting 5. Alternatively, the temporary securement may be effected by inserting the hook portion 3 of the strip 1 into the aperture 4, encircling the pipe 18 with the strip 1, and inserting the other hook portion 3' into the aperture 4' in the fitting 5.

It is noted that the pipe 18 is held temporarily to the fitting 5 in such a way that after the insertion of the hook portion 3' into the aperture 4', the hook portions 3 and 3' are expanded outwardly due to the resiliency of the strip 1.

Following this, the securing operation is completed by securing the bolt 8 and nut 9 in place as shown in FIG. 1.

According to this invention, the following advantages are achieved:

1. Since the strip 1 of sheet metal is made of resilient material, it easily encloses the pipe 18 due to its resiliency and it can be easily manufactured since the configuration thereof is quite simple.

2. Although the strip 1 of sheet metal is resilient, after it encircles the pipe 18, the operation to fixedly secure the looped sheet 1 to the fitting 5 is easily effected since the looped sheet 1 may be temporarily attached to the fitting 5 to the substantial securing operation by means of the engagement of the hook portions 3,3' of the loop 1 to the fitting 5 through openings 4,4' in the fitting.

3. Since the strip 1 of sheet metal may be made of resilient metal such as resilient stainless steel, it proves to be highly durable even in the worst atmospheric conditions where dew and condensation occur. Furthermore, since the material is superior to ordinary structural material in strength, the overall weight can be reduced.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A pipe hanger comprising a pipe holder made from a strip of sheet material formed into a loop, said strip having two end portions forming lugs extending generally radially relative to said loop, said lugs having terminating end sections forming hooks, a fitting means from which said pipe holder is suspended, said fitting means having a mounting portion formed as a closed loop element adapted to be rotatably secured to a ceiling and an inserting portion inserted into the space between said lugs, said inserting portion being in the form of projections extending generally radially from said loop element, said fitting means having apertures in which said hooks are accommodated, said pipe holder being initially temporarily mounted on said fitting means by engagement of said hooks in said apertures, and fastening means for securing said pipe holder to said fitting means, whereby said pipe holder is initially temporarily secured to said fitting means by engagement of said hooks in said apertures and subsequently completely secured by said fastening means.

2. A pipe hanger according to claim 1 wherein said lugs and said inserting portion of said fitting means have aligned openings, said fastening means comprising a bolt passing through said aligned openings.

3. A pipe hanger according to claim 1 wherein said looped strip is made of a resilient material which is adapted to be flexed to be fitted around a pipe.

4. A pipe hanger according to claim 1 wherein said looped strip has a lower portion opposite said lugs, said lower portion having an outwardly protruding section.

5. A pipe hanger according to claim 1, wherein elongated apertures are formed in the sides of said looped strip.

6. A pipe hanger according to claim 1 wherein said apertures are formed generally at the juncture of said loop element and said projections.

7. A pipe hanger according to claim 1 wherein said loop element has an aperture, and a cylindrical element rotatable in said aperture, said cylindrical element being adapted to be suspended from a ceiling.

* * * * *